United States Patent [19]
Kechriotis

[11] Patent Number: 5,355,613
[45] Date of Patent: Oct. 18, 1994

[54] VARIABLE BUOYANCY NATURAL BAIT CAST FISHING LURE

[76] Inventor: George Kechriotis, 1557 SW. 7th Ct., Boca Raton, Fla. 33486

[21] Appl. No.: 9,817

[22] Filed: Jan. 27, 1993

[51] Int. Cl.⁵ .............................................. A01K 85/00
[52] U.S. Cl. .................................. 43/42.22; 43/42.33
[58] Field of Search ................ 43/42.22, 42.31, 42.32, 43/42.33, 42.34, 42.45, 42.47, 43.14

[56] References Cited

U.S. PATENT DOCUMENTS

| | | | |
|---|---|---|---|
| 1,313,567 | 8/1919 | Ulrich | 43/42.22 |
| 1,878,015 | 9/1932 | Steffensen | 43/43.14 |
| 2,149,054 | 2/1939 | Jones | 43/42.22 |
| 2,274,596 | 2/1942 | Fink | 43/42.22 |
| 2,478,801 | 8/1949 | Yungel | 43/42.22 |
| 2,529,642 | 11/1950 | Vaughn et al. | 43/42.32 |
| 2,672,704 | 3/1954 | Smith | 43/42.33 |
| 2,706,359 | 4/1955 | Beames | 43/42.09 |
| 2,738,610 | 3/1956 | Rice | 43/42.31 |
| 3,359,674 | 12/1967 | Strumor | 43/43.14 |
| 3,528,189 | 9/1970 | Lilley, Jr. | 43/42.33 |
| 3,628,274 | 12/1971 | Wojohn | 43/43.12 |
| 3,670,447 | 6/1972 | Wohead | 43/43.14 |
| 3,727,341 | 4/1973 | Nye | 43/42.12 |
| 3,796,000 | 3/1974 | Nye | 43/43.13 |
| 3,820,269 | 6/1974 | Rae | 43/42.05 |
| 3,974,590 | 8/1976 | Boone | 43/43.14 |
| 4,015,363 | 4/1977 | Sedlak | 43/42.22 |
| 4,079,539 | 3/1978 | Holstein | 43/43.13 |
| 4,108,955 | 8/1978 | Thom | 264/222 |
| 4,155,191 | 5/1979 | Spivey | 43/42.22 |
| 4,161,078 | 7/1979 | Pagani | 43/43.13 |
| 4,229,899 | 10/1980 | McGahee | 43/42.09 |
| 4,238,444 | 12/1980 | Thom | 264/226 |
| 4,257,182 | 3/1981 | Thom | 43/42.06 |
| 4,637,160 | 1/1987 | Biskup | 43/42.33 |
| 4,689,914 | 9/1987 | Quinlan | 43/42.22 |
| 4,785,569 | 11/1988 | Thomas, Jr. | 43/42.31 |
| 4,791,750 | 12/1988 | Gammill | 43/42.31 |
| 4,803,793 | 2/1989 | Schellenberg, III | 43/42.33 |
| 4,956,934 | 9/1990 | Dahl | 43/42.31 |
| 5,001,856 | 3/1991 | Gentry | 43/42.31 |
| 5,134,799 | 8/1992 | Trnka | 43/42.22 |

*Primary Examiner*—P. Austin Bradley
*Assistant Examiner*—Chuck Y. Mah
*Attorney, Agent, or Firm*—Malin, Haley, DiMaggio & Crosby

[57] ABSTRACT

A fishing lure is described containing a cast of a natural bait encased in a castable transparent material designed in hydrodynamically correct shapes and to operate at different depths by utilizing an adjustable buoyancy device. A cast of a natural bait being the embodiment of a natural bait in the form of a castable material taken from the cast of a natural bait and then painted, to which an adjustable buoyancy device is incorporated by containment within the lure or attachment to the lure of a sealed air chamber wherein the adjustable portion consists of a cylinder which is threaded on the inside to accommodate a set screw/gasket seal combination. Rotation of the set screw varies the lure's buoyancy by compressing the air in the air chamber thus varying the fluid displacement volume of the lure and also changing the center of gravity of the lure.

9 Claims, 3 Drawing Sheets

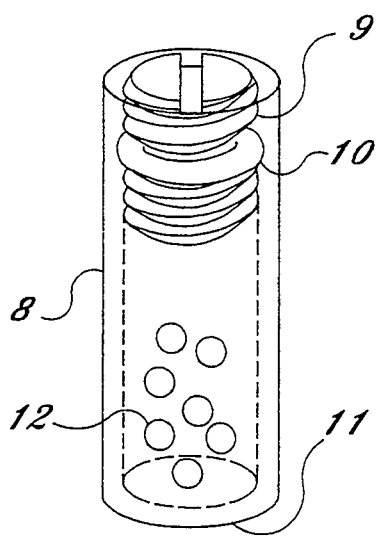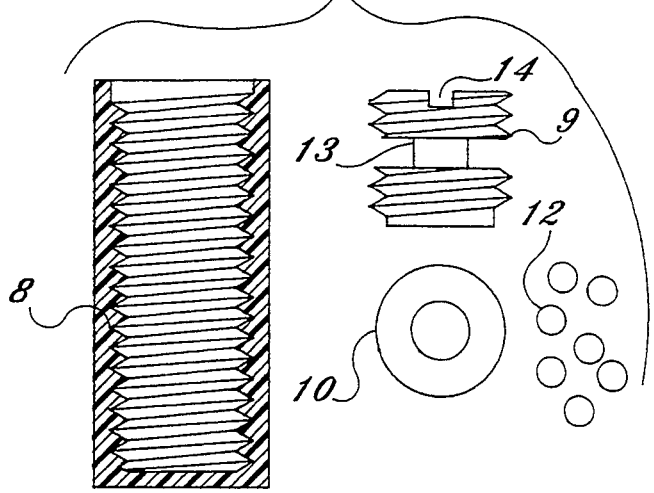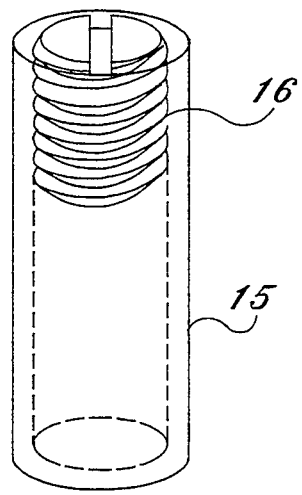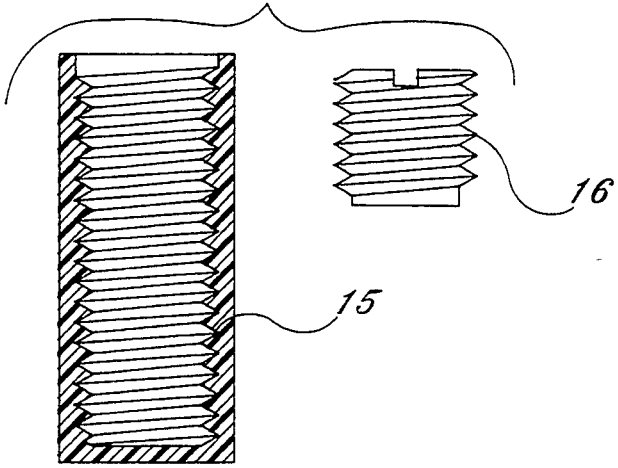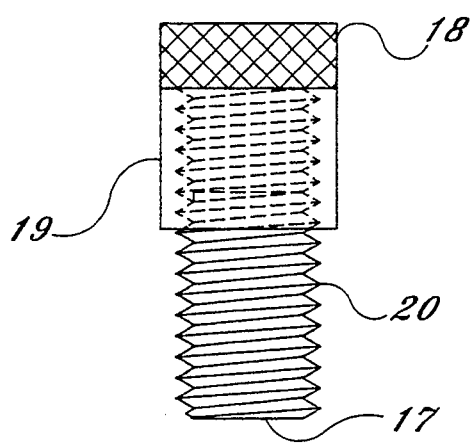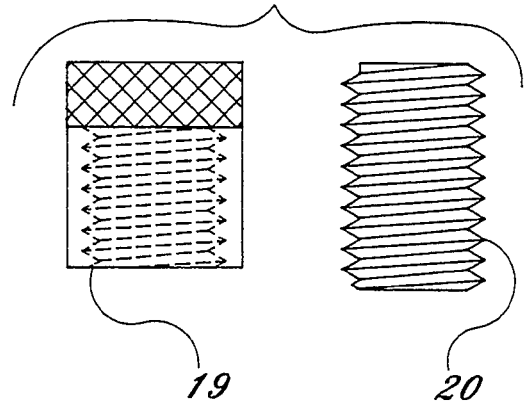

VARIABLE BUOYANCY NATURAL BAIT CAST FISHING LURE

BACKGROUND OF THE INVENTION

1. Field of the Invention

This invention relates generally to fishing lures, in particular to a fishing lure made of a cast of a natural bait encased in a clear castable material, and incorporating a sealed air chamber which causes it to swim upright in the water and by a simple adjustment can be made to either float at the surface, or dive at different desired depths required of different fishing 2. Description of the Prior Art In the past, a wide variety of artificial fishing lures have been available. It has been the intention of most lures to attract and entice various species of game fish into striking and taking the lure as if it were its natural forage.

Common methods employed in the design and manufacture of prior art fishing lures traditionally have been to reproduce the appearance or imitate the live motion of the game species' natural bait. Previous designs have been carved out of wood or molded from plastic materials in the shape of fish, frogs, shrimp, etc. and then painted to resemble these baits. Other designs have encased light reflective materials or photographs (Liley U.S. Pat. No. 3,528,189 and Shellenberg U.S. Pat. No. 4,803,793) inside of a clear plastic body.

Disadvantages of many of these prior art lures are that in the case of carved or molded lures, they can never be made to totally reproduce the detail of form found in nature. In the case of photographs, they can reproduce the clear detail and colors found in nature but only in two dimensions, even a three dimensional photograph appears as a line (i.e., the edge of the photograph) when viewed upon from the top of its vertical axis.

U.S. Pat. No. 3,820,269 to Roe discloses a dehydrated bait embodied in a transparent castable material. This would seem to have accomplished the task of producing a realistic looking lure. However, disadvantages here are that an actual baitfish must be used which would create obvious drawbacks in its manufacture and a needless waste of aquatic life. Another disadvantage is that the color of a living fish is determined as a function of life within the cell tissue of the skin of the fish. In the same way as a chameleon changes its color, color is determined by a delicate chemical balance within the cells that produce and contain pigment. By taking cues from internal and external stimuli, color is automatically adapted to changing water conditions, different degrees of daylight or darkness or even from causes such as aggression, stress or fear. In fact, many fish themselves can change color at will. Hence, once the fish dies, the delicate chemical pigment balance is lost. Also, even though pigments remain, they are dulled or different altogether from the original living color. Thus, within a short time the remaining pigments brown and fade as these natural pigments are unstable and no longer have the function of life within the cell tissues to alter these chemically active pigments or to replenish them when they break down.

As mentioned above, if the fish is dehydrated by methods such as freeze drying or dehydration solutions before it is encased, as Roe suggests, the tissue will deform and wrinkle. In the case of freeze drying or in the case of using dehydration solutions, the mucous membranes and mucous that surrounds the eyes, gills and most of the scales and skin of the fish are leached away or dried up by the solution and thus, creating an aberration from the original form of the bait.

Other prior art lures have incorporated not just the appearance of the bait, but also imitation of the motion of a live bait. Some of the better hydrodynamically designed lures are effective by creating vibrations in the water. Some lures are further enhanced by rattles which entice game fish to strike the lure.

In order to be able to fish at different depths, in an endless variety of trolling or casting situations, fisherman in the past have had to keep a large variety of lures on hand. To accomplish this purpose there have been art lures which have incorporated methods of adjustable depth control such as lips or spoons so as to force the lure down as it is pulled forward through the water. U.S. Pat. No. 1,200,135 to Reynolds, U.S. Pat. No. 2,944,393 to Poe, U.S. Pat. No. 3,874,109 to Peterson and U.S. Pat. No. 3,858,344 to Watts are examples of such designs. U.S. Pat. No. 2,598,012 to Prieur discloses an angled forward lure body with the line attached to the top of the lure and accomplishes diving by this same principal of being forced down when being pulled forward through the water as a result of is hydrodynamic shape. One problem with these types of lures is that various depths are achieved only as a function of various rates of retrieval of the lure.

U.S. Pat. No. 4,689,914 to Quinlan achieves variable buoyancy by allowing water into or out of a hollow flexible lure through a vent opening. U.S. Pat. No. 4,155,191 to Spivey discloses a hollow body having a slidable mass therein which in one position entraps air within the lure while in a second position allows water into the chamber. These lures can be made to either float on the surface or dive to the bottom, but are not accurately adjusted for fishing at intermediate depths.

Another method of achieving adjustable depth control has been by changing the density of the lure by using a detachable weight as disclosed in U.S. Pat. No. 3,205,60 to Knapton or by utilizing a selection of detachable hooks of different weights, as discloses in U.S. Pat. No. 4,229,899 to McGahee. This system achieves variable depth control but is undesirable due to the need to disassemble and reassemble the lure.

Another problem plaguing the side-to-side vibratory motion of these designs is the ability to place the lure at the same depth as the intended game fish are swimming or feeding. Most prior art lures, as a function of design, are made to either float on or near the surface, sink to the bottom, or operate at a predetermined depth in the water which has been determined and set during manufacture and is fixed in the density, center of gravity and hydrodynamic shape of the lure itself. Therefore, the lure will only operate properly at the depth for which it was designed.

Therefore, a need exists for a bait/lure which more closely resembles the appearance and colors of live bait over the attempts of the prior art and which can be effectively and easily adjusted to operate at different desired depths. It is, therefore, to the effective resolution of the aforementioned problems and shortcomings that the present invention is directed.

SUMMARY OF THE INVENTION

The present invention overcomes the limitations of the prior art by the process of obtaining a natural bait from as fresh a source as possible and then casting the entire body with a flexible rubber form such as latex or silicone rubber. This rubber cast which has been imprinted with the contours of the baitfish can be used to cast replicas of the original bait.

For preserving the natural living colors of the bait being used, the casted baitfish can be painted in its vibrant natural colors and can be matched almost perfectly by the synthetic pigment paint technology presently available. Studying and reproducing the colors of the different species of bait under different conditions, such as day or nighttime colors or the colors a bait displays when under stress, in fear or showing weakness, may further entice a game fish to strike the lure. After the cast replica is painted, the cast is sealed and encased in a clear larger cast which hydrodynamically correct and balanced so as to swim through the water in a natural appearing motion.

Furthermore, the present invention also utilizes an improved method of achieving adjustable depth control. The subject invention can be adjusted so as to change its buoyancy by applying the same principal as a living fish does to accomplish this end by compressing air contained within it's air bladder. The mechanical equivalent is achieved by compression of air within a sealed air chamber so as to change the fluid displacement volume of the lure., which in effect changes its buoyancy within the water. The lure can not only be made to float or dive, but with a slight adjustment by the user, can be made to operate at desired intermediate depths. This aspect of the present invention can also be utilized in conjunction with conventional fishing lures presently in use as well as being able to be incorporated within the body of newly manufactured fishing lures.

Accordingly, the primary object of the present invention is to reproduce in an artificial bait as much as possible the appearance in the water of a live bait.

It is yet another object of the present invention to provide a fishing lure which as much as possible has the appearance in the water of a live bait.

It is still another object of the present invention to provide a fishing lure which can easily achieve various depth levels.

It is still another object of the present invention to provide a fishing lure which is relatively low in cost and easy to manufacture.

These and other objects and advantages of the present invention will become apparent from the following description taken in conjunction with the accompanying drawings wherein set forth, by way of illustrating and example, certain embodiments of this invention. The drawings constitute a part of this specification and include exemplary embodiments of the present invention and illustrate various objects and features thereof.

BRIEF DESCRIPTION OF THE DRAWINGS

The invention may be better understood by reference to the drawings in which:

FIG. 4 is an exploded perspective view of the adjustable buoyancy device portion of the invention;

FIG. 5 is an exploded view of the individual components of the adjustable buoyancy device;

FIG. 6 is a plan view of another form of the adjustable buoyancy device;

FIG. 7 is a plan view of the individual parts of the adjustable buoyancy device depicted in FIG. 6;

FIG. 8 is a plan view of yet another form of the adjustable buoyancy device;

FIG. 9 is a plan view of the individual parts of the adjustable buoyancy device depicted in FIG. 8;

DETAILED DESCRIPTION OF THE INVENTION

Figure 1:
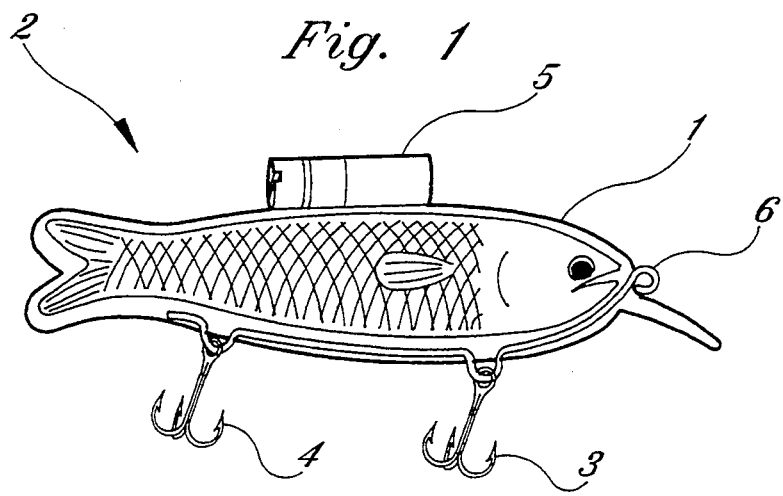
FIG. 1 is a plan view of a fishing lure constructed in accordance with the present invention.

Referring to FIG. 1, a first embodiment of the present invention fishing lure is comprised of a cast of a baitfish 2 which has been made from a castable material which has been taken from the cast of a natural bait. The natural bait cast is then painted to enhance and reproduce its original living colors. The bait may also be painted in an array of arbitrary color combinations.

Figure 2:
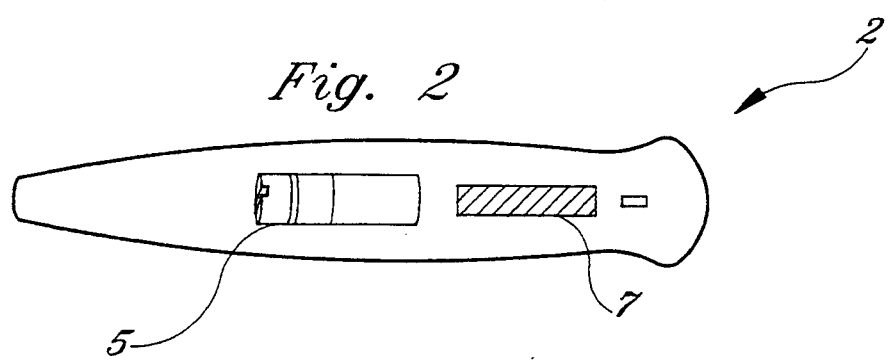
FIG. 2 is an elevated view of the top of the invention depicted in FIG. 1.
Figure 3:
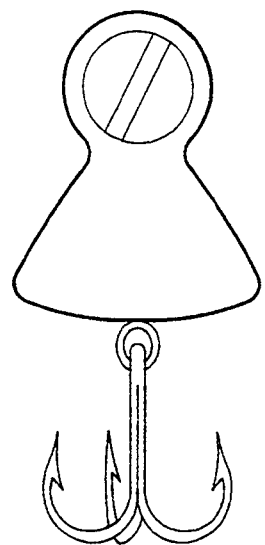
FIG. 3 is a plan view of the back of the invention depicted in FIG. 1.

Referring again to FIG. 1, the baitfish is encased in a clear resin, plastic or other castable material. A length of stainless steel wire 6 is embedded partially within the clear plastic body of the lure so as to attach hooks (4 and 5). Other types of wire may be used or alternatively screw eye hooks or other similar attachments may be used to attach the hooks to the body of the lure. An adjustable buoyancy device 5 can be attached to the top of the lure. This buoyancy device could also be contained within the body of the lure but is displayed on top for reasons of clarity in the drawing. Referring to FIG. 2, a light reflective strip of foil or other reflective material may be encased within the lure in order to increase the lure's visibility.

An air space can be disposed within the body of the lure to ensure that the lure balances in an upright position within the water, thus, more accurately resembling an actual living baitfish. A foam like material can be substituted for the air space and would also be disposed within the body of the lure. Furthermore, other materials having a less density than the lure itself may also be utilized.

FIG. 4 shows an embodiment of a clear version of the adjustable buoyancy device portion of the invention. A clear plastic cylinder 8 has been threaded on the inside surface to accommodate a flexible gasket 10 and set screw 9 combination. The set screw may be made to accommodate (at point 14) a pan head screwdriver, a phillips head screwdriver, allen wrench or the like. The cylinder 8 is open at one end and sealed at the other end 11. Referring to FIG. 5, the set screw 9 has been notched at point 13 so that the flexible gasket 10 or o-ring 10 is placed there in order to create a seal when screwed into the threaded cylinder 8. This seal should be made tight enough so as to not allow water to enter the inside of the cylinder. Beads or ball bearings 12 may be placed within the cylinder so that the lure rattles as it vibrates. A small jingle bell may also be used instead of or in addition to the beads in order to create a high frequency jingle or ring which should travel further through the water then the rattle alone.

Referring to FIG. 6, another version of an adjustable buoyancy device composed of a cylinder 15 and set screw 16 in FIG. 7, which are manufactured of materials which naturally form a seal on contact between their respective surfaces. An example of this combination is a flexible rubber set screw 16 inside of a rigid plastic threaded cylinder 15. A seal can be created between the set screw 16 and the threaded cylinder 15 if they are both composed or rigid materials and then a gel such as petroleum jelly or grease is coated around the set screw 16 and inside the inner wall of the threaded cylinder 15. This seal again should be secure enough so as to not allow water to enter the cylinder. The seal may be made tight enough so as to contain air or other gases under pressure while it is compressed as the set screw 16 is screwed into the cylinder 15, or the seal may be made to be loose enough to allow the air to escape or enter the cylinder under pressure but still tight enough so as to not allow water to enter the inner portion of the threaded cylinder 15.

Referring to FIGS. 8 and 9, a further embodiment of the adjustable device is presented which may be adjusted manually without need of a screwdriver. The device is constructed of two cylinders. Cylinder 19 is sealed at one end 18 and is threaded on the inside surface of the cylinder. Cylinder 20 is sealed at one end 17 and is threaded on the outer portion of the cylinder so that it may be screwed into cylinder 19 as depicted in FIG. 8. The cylinders 18 and 19 should be constructed again of materials which naturally form a seal when the surfaces come in contact with one another, or a gel or gasket may again be used to create a seal so as to not allow water to enter the cylinders. The thumb notches on cylinder 19 could also be notched on the other cylinder 20 and their purpose is to enable one to turn the cylinders with their fingers.

Figure 10:
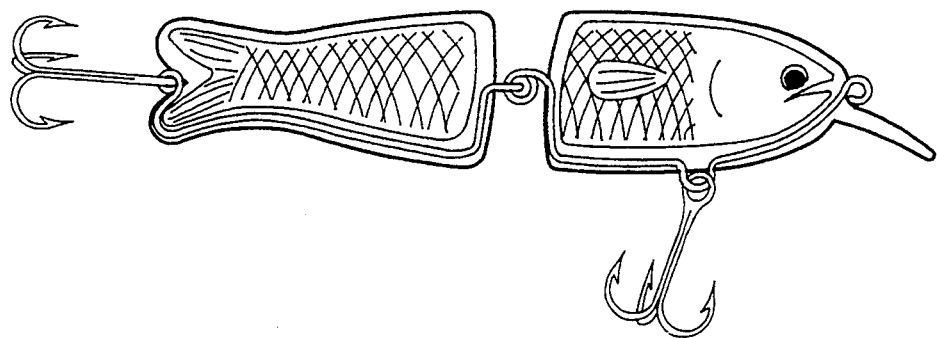
FIG. 10 is a plan view of a fishing lure constructed in accordance with the present invention but not incorporating an adjustable buoyancy device.

FIG. 10 is an embodiment of a fishing lure containing a painted bait cast, but constructed without an adjustable buoyancy device. The lure is manufactured in two pieces which have been joined together in what is commonly referred to as a jointed fishing lure. The outer cast 21 has the purpose of creating a shape that is hydrodynamically correct. That is, for example, the lip on the front of the lure will tend to draw the lure downwards as it is pulled forward through the water. Different outer cast shapes can be used to create different motions through the water such as the amount of pitch or frequency of wobble as it travels through the water.

Figure 11:
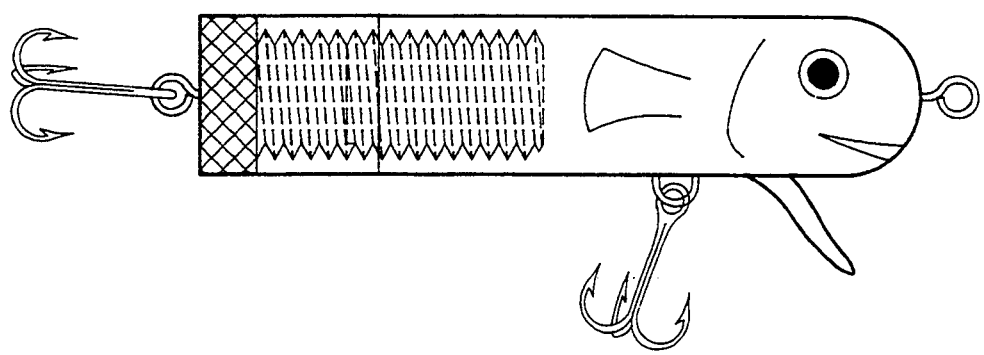
FIG. 11 is a plan view of a conventional fishing lure incorporating the adjustable buoyancy device depicted in FIG. 8.

FIG. 11 is an embodiment of a fishing lure which incorporates an adjustable buoyancy device of the type depicted in FIG. 8.

Figure 12:
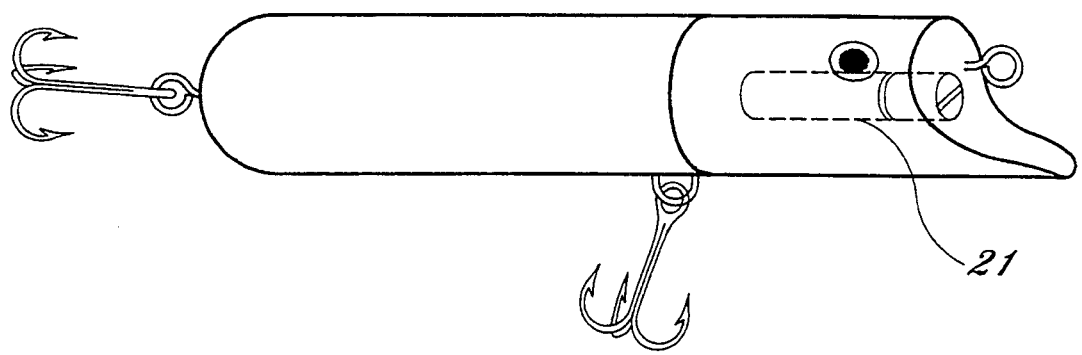
FIG. 12 is a plan view of a fishing lure of a conventional fishing lure incorporating the adjustable buoyancy device shown in FIG. 4.

FIG. 12 is an embodiment of a common form of a fishing lure which incorporates an adjustable buoyancy device 21 of the type shown in FIG. 6. However, the alternative embodiments for the adjustable buoyancy device described above can also be incorporated in any common form of fishing lure.

The present invention has been described using a baitfish, however the present invention is not limited only to baitfish and other forms of bait consumable by a fish are within the scope of the present invention.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to considered limited to what is shown in the drawings and described in the specification.

What I claim as new and desire to secure by Letters Patent of the United States is:

1. A fishing lure, comprising: a body member; and means for adjusting the buoyancy of the fishing lure to achieve various depth levels operatively associated with said body member, said means for adjusting including a first cylinder, the first cylinder having an inside surface, a portion of the inside surface of the first cylinder being threaded, the first cylinder having a closed first end and an open second end, said means for adjusting further including means for closing the second end of the first cylinder, said means for closing is a screw at least partially disposed within the first cylinder at the second end of the first cylinder, wherein the buoyancy of the lure is varied by varying the position of the screw within the first cylinder.

2. The fishing lure of claim 1, wherein the screw having a plurality of threads for mating with the threaded inside surface portion of the first cylinder.

3. The fishing lure of claim 1, wherein said means for adjusting further including a means for sealing the second end of the first cylinder.

4. The fishing lure of claim 3, wherein the screw contains a notch for receiving said means for sealing.

5. The fishing lure of claim 4, wherein said means for sealing is a gasket or O-ring.

6. The fishing lure of claim 3, wherein the first cylinder and the screw are constructed of rigid materials and said means for sealing is a gel or grease disposed between the screw and the first cylinder.

7. A fishing lure, comprising: a body member; and means for adjusting the buoyancy of the fishing lure to achieve various depth levels operatively associated with said body member, said means for adjusting including a first cylinder, the first cylinder having an inside surface, a portion of the inside surface of the first cylinder being threaded, the first cylinder having a closed first end and an open second end, said means for adjusting further including means for closing the second end of the first cylinder said means for closing is a second cylinder at least partially disposed within the first cylinder at a first end and having an outer surface, a portion of the outer surface being threaded for mating with the threaded inner surface portion of the first cylinder, the second cylinder having a closed second end, wherein the buoyancy of the lure is varied by varying the position of the second cylinder within the first cylinder.

8. The fishing lure of claim 7, wherein at least one of said cylinders having means for aiding in manually turning the cylinders.

9. A fishing lure, comprising: a body member; and means for adjusting the buoyancy of the fishing lure to achieve various depth levels operatively associated with said body member, said means for adjusting including a first cylinder, the first cylinder having an inside surface, the first cylinder having a closed first end and an open second end, said means for adjusting further including means for closing the second end of the first cylinder, said means for closing is a second cylinder at least partially disposed within the first cylinder at a first end for mating with the first cylinder, the second cylinder having a closed second end, wherein the buoyancy of the lure is varied by varying the position of the second cylinder within the first cylinder.

* * * * *